United States Patent
Jemili et al.

(10) Patent No.: US 12,422,313 B2
(45) Date of Patent: Sep. 23, 2025

(54) SENSOR DEVICE FOR MEASURING A TEMPERATURE DIFFERENCE IN A COMPUTER CHIP SYSTEM

(71) Applicant: Robert Bosch GmbH, Stuttgart (DE)

(72) Inventors: Amin Jemili, Kusterdingen (DE); Jochen Reinmuth, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 554 days.

(21) Appl. No.: 17/660,506

(22) Filed: Apr. 25, 2022

(65) Prior Publication Data

US 2022/0357219 A1   Nov. 10, 2022

(30) Foreign Application Priority Data

May 7, 2021   (DE) ............... 10 2021 204 646.0

(51) Int. Cl.
*G01K 17/08*   (2006.01)
*G01K 1/26*   (2006.01)

(52) U.S. Cl.
CPC ............... *G01K 17/08* (2013.01); *G01K 1/26* (2013.01)

(58) Field of Classification Search
CPC ............ G01K 17/08; G01K 1/26; G01K 7/34
See application file for complete search history.

(56) References Cited

U.S. PATENT DOCUMENTS

2019/0100426 A1   4/2019   Painter et al.

FOREIGN PATENT DOCUMENTS

| CN | 112749494 A | * | 5/2021 | ............. G06F 16/29 |
| IT | 102019000008520 | * | 4/2021 | |

OTHER PUBLICATIONS

Flinn Scientific, "Radiometry", 2016, https://www.flinnsci.com/api/library/Download/0f2b5db06af54b6092f318c576efed6d (Year: 2016).*
Sista and Bhattacharya: "Knudsen force based MEMS structures," Journal of Micromechanics and Microengineering 24 (2014) 045003, pp. 1-5.
Strongrich and Alexeenko: "Knudsen Thermal Force Generation at the Microscale," ASME 2014 International Mechanical Engineering Congress and Exposition (IMECE 2014-38724), Canada, ASME vol. 46569. American Society of Mechanical Engineers, (2014), pp. 1-5.

* cited by examiner

*Primary Examiner* — Laura Martin
*Assistant Examiner* — Julia Fitzpatrick
(74) *Attorney, Agent, or Firm* — NORTON ROSE FULBRIGHT US LLP

(57) ABSTRACT

A sensor system. The sensory system includes a substrate extending in a substrate plane, a closed cavity and a movable structure in the closed cavity, at least one portion of the movable structure being situated at a distance opposite a surface of the substrate extending in parallel to the main extension plane within the cavity, the distance varying when the movable structure is deflected, a temperature difference between the surface of the substrate and the movable structure being measurable by an action of force on the movable structure.

7 Claims, 3 Drawing Sheets

SENSOR DEVICE FOR MEASURING A TEMPERATURE DIFFERENCE IN A COMPUTER CHIP SYSTEM

CROSS REFERENCE

The present application claims the benefit under 35 U.S.C. § 119 of German Patent Application No. DE 10 2021 204 646.0 filed on May 7, 2021, which is expressly incorporated herein by reference in its entirety.

FIELD

The present invention relates to a sensor system, including a micro-electro-mechanical sensor, which is used for measuring a temperature difference directly within a chip system or within a substrate, in order to obtain thereby very precise information about the genuine cooling capacity of the chip system or of the substrate.

BACKGROUND INFORMATION

Increasing, digitalization entails a constant striving for more processing power in computers. Along with the growing performance requirements of computers, the demand of users for improved comfort features of computer systems have also grown in recent years. This includes inter alia ventilation processes that are as quiet as possible or a compact design in order to offer the user more spatial mobility. Current examples of computers with these requirement profiles are laptops, Ubooks, smart phones and smart watches.

In order to be able to strike the balance between the requirement profiles in optimal fashion, it is important to know the cooling capacity to which a chip of the circuit board or a substrate is subject through its environment. The cooling capacity for a computer or a computer component and an air flow frequently used for this purpose, in particular within a housing, may change depending on the environment. In order to be able to assess the cooling capacity correctly, it is therefore important to know the temperature or the temperature change or the temperature gradient, which a component or a component substrate experiences on the circuit board of a computer.

According to the related art, it is possible to place temperature sensors on a component of the circuit board in order to measure its temperature, this method being on the one hand elaborate and expensive and on the other hand being able to measure only the external temperature gradient and not the temperature gradient forming in the interior of the component. Furthermore, in this case there is also the danger that measured values of the sensors may be distorted. Thermal contacts of the temperature sensors may change over the service life and thereby also distort the measured values.

SUMMARY

It is an object of the present invention to provide a micro-electro-mechanical sensor system, with the aid of which it is possible to measure a temperature difference or a temperature gradient in a chip or on a chip. It is furthermore an object to provide a micro-electro-mechanical sensor system, which is capable of outputting stable and precise measured values.

A sensor system according to an example embodiment of the present invention may have the advantage over the related art that a temperature difference or a temperature gradient may be measured directly within a substrate or within multiple substrates (or chips), so that the effectiveness of temperature sensors may be improved. This advantageously makes it possible to obtain very precise information about the cooling capacity available to a substrate (or a component or a chip) on a circuit board. The present invention thus makes it possible to measure an internal temperature (or an internal temperature difference or an internal temperature gradient), while according to the related art only an external temperature is measurable. According to the present invention, the measurement is based on the radiometric effect. For this purpose, the sensor system comprises a cavity closed to the outside. A movable structure is situated in the cavity, at least one portion of the movable structure being situated at a distance opposite a surface of the substrate extending essentially in parallel to the main extension plane within the cavity. Therefore, at least a portion of the movable structure and the respective surface of the substrate are situated at a distance opposite each other in the cavity. A temperature difference between the substrate surface within the cavity and the movable structure situated opposite at a distance (or the opposite portion or the opposite surface of the movable structure) results in a measurable action of force or in a deflection of the movable structure, which may be evaluated particularly in capacitive fashion.

Advantageous further developments and specific embodiments of the present invention are disclosed herein.

One specific example embodiment of the present invention provides for the movable structure to experience a deflection in a direction essentially perpendicular to the main extension plane as a function of the temperature difference between the surface of the substrate and the movable structure. In particular, it is provided or preferred that at least one portion of the movable structure is situated in essentially planar fashion opposite a corresponding portion of the surface of the substrate are situated essentially in parallel to each other.

One specific example embodiment of the present invention provides for the gas pressure in the cavity to be chosen in such a way that the distance between the movable structure and the surface of the substrate amounts at a maximum to 25 times and at a minimum to one thousandth of the mean free path length of the gas molecules enclosed in the cavity, i.e., the mean free path length of the gas particles enclosed in the cavity corresponds to a factor of between 0.04 (at comparatively high pressures) and 1000 (at comparatively low pressures) of the distance between the (surface of the) movable structure and the surface of the substrate. If the pressure of the enclosed gas volume is set to be so high that the free path length is much lower than this distance (that is, in particular even lower than a factor of 0.04 of this distance), then due to the impacts between the gas molecules no impulse may be exchanged between the movable structure and the surface of the substrate, since the impulse difference is lost due to the intermolecular impacts. If the pressure of the enclosed gas volume is chosen to be so low that the free path length is much greater than this distance (that is, in particular greater than a factor of 1000 of this distance), only few molecules are present, which are able to perform an impulse transmission and thus only a small force is exerted on the movable structure, which results in a lower sensitivity of the measurement. It is furthermore preferred that the mean free path length of the gas particles enclosed in the cavity correspond to a factor of between 0.1 to 100, preferably a factor between 0.25 and 10, of the distance between the (surface of the) movable structure and the surface of the substrate.

According to the present invention, the geometric formation of the sensor system is designed in such a way that opposite the movable structure at least one electrode is situated in parallel to the main extension plane or in the main extension plane and that the deflection of the movable structure perpendicular to the main extension plane is measurable in capacitive fashion. This allows for a particularly precise or sensitive measurement.

One specific example embodiment of the present invention furthermore provides for the movable structure to be implemented as a two-sided rocker structure having an axis of rotation, the rocker elements being situated opposite the surface of the substrate. This provides the advantage that accelerative forces applied from outside are balanced out via the axis of rotation of the rocker structure.

One advantageous specific example embodiment of the present invention provides for a geometric asymmetry of the rocker structure about the or relative to the axis of rotation (with respect to a projection direction perpendicular to the main extension plane), although the two sides of the rocker structure are balanced out (relative to the axis of rotation) with respect to accelerative forces acting perpendicularly to the main extension plane. A geometric asymmetry of the relations in the area of the rocker structure is important especially so as to be able to measure a temperature-induced deflection of the rocker structure when the distances of both rocker elements from the respective opposite surface of the substrate are essentially equal. According to the considered specific embodiment, the distances on both sides of the axis of rotation between the respective substrate surface on the one hand and the respectively opposite surface of the movable structure or of the rocker element are essentially equal, so that the temperature-induced actions of force on both sides of the axis of rotation would also balance out, which is avoided by the geometric asymmetry of the rocker structure about the (or relative to the) axis of rotation.

Apart from the geometric asymmetry of the rocker structure, it is possible according to another specific example embodiment of the present invention to produce a rocker structure having identical rocker elements, which are, however, at different distances from the surface of the substrate below. The different distances from the surface of the substrate below result in an asymmetrical distribution of forces in spite of a (geometrically) symmetrical rocker structure.

It is important in this regard that the distances are chosen in such a way that the greater distance is equal to or greater than the free path length of the gas molecules enclosed in the cavity. An essential advantage of this specific example embodiment is a simple production process for a symmetrical rocker structure.

In another advantageous specific example embodiment of the present invention, it is possible to place further rocker structures in or on the chip or the substrate in order to determine corresponding further temperature gradients. For this purpose it is possible to situate these rocker structure in a single closed cavity and/or in separate closed cavities. The rockers may have relative to each other similar and/or different surface asymmetries, similar and/or different mass asymmetries, similar and/or different distance asymmetries with respect to the surface of the substrate.

In case of the existence of multiple cavities, the present invention preferably provides in particular for the pressures to differ in the gas volumes enclosed in the cavities. For example, it is thus advantageously possible according to the present invention that a first movable structure is enclosed in a vacuum (or in a more highly evacuated cavity), so that it is essentially sensitive only to an acceleration applied from outside. A second (in particular identical) movable structure is enclosed in a second cavity in a pressure range relevant for the radiometric effect. The difference of the signals of the two structures is then a measure for the temperature gradient applied on the chip.

Exemplary embodiments of the present invention are illustrated in the figures and explained in greater detail in the following description.

DETAILED DESCRIPTION OF EXAMPLE EMBODIMENTS

In the various figures, identical parts are always provided with the same reference symbols and are therefore normally labeled or mentioned only once.

Figure 1:
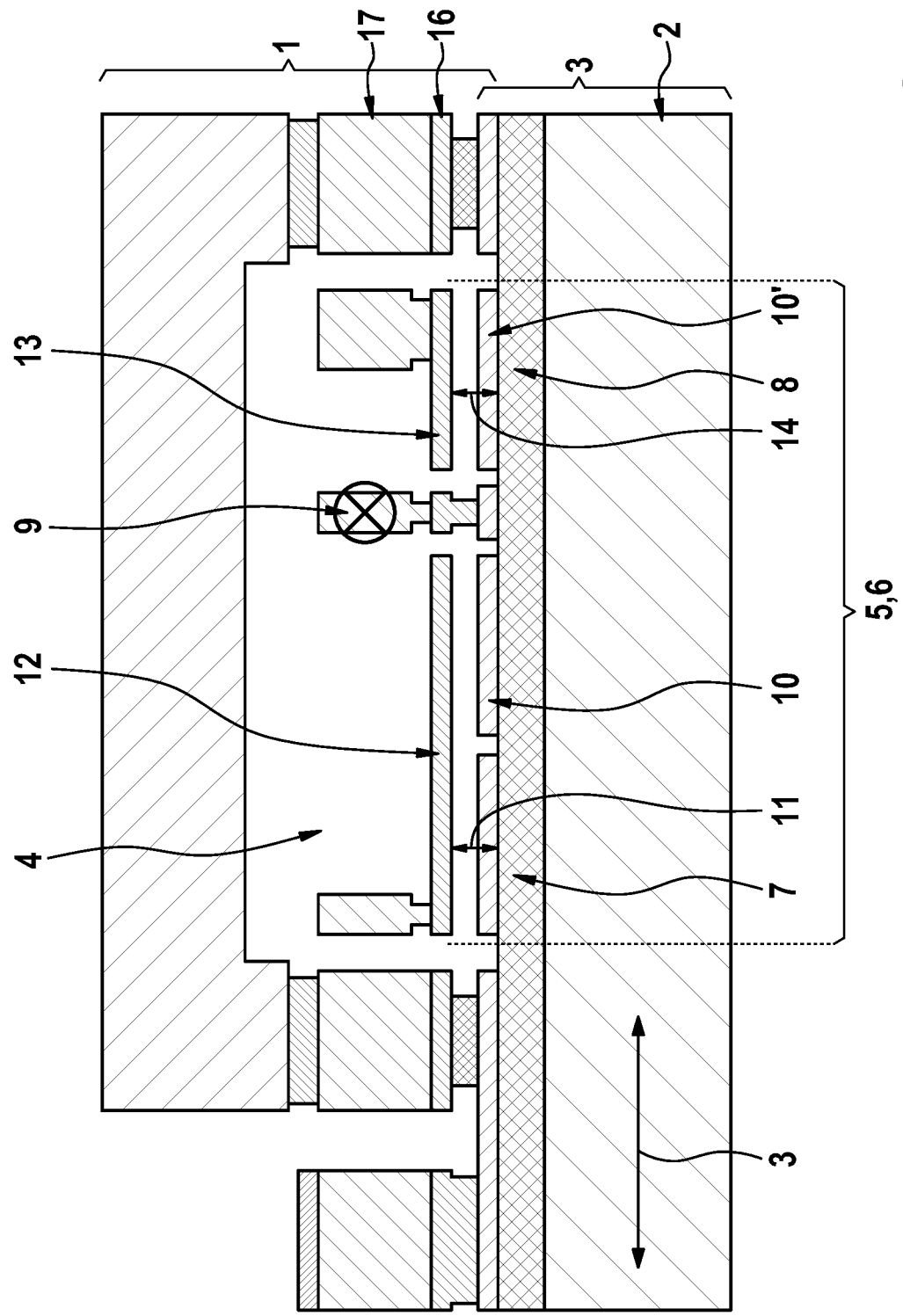
FIG. 1 shows a schematic representation of the sensor system according to a first specific example embodiment of the present invention.

FIG. 1 shows a sensor system 1 according to a first specific embodiment of the present invention, sensor system 1 being implemented on or in a substrate 2 having a main extension plane 3 or a main extension plane 3 of substrate 2. In the first specific embodiment, a movable structure 5 is implemented in the form of a rocker structure 6. Rocker structure 6 is situated on (or above) the surface 7 of substrate 2 within a cavity 4, cavity 4 being formed with the aid of a cap structure (shown in FIG. 1 above rocker structure 6, but not labeled by a reference symbol), so that the cavity comprises or encloses the rocker structure 6 completely. The cavity represents a sealed, in particular hermetically sealed volume, so that the rocker structure 6 is also sealed, in particular hermetically sealed. In the hollow space of the cavity, a gas volume having a defined pressure exists. The rocker structure 6, which is connected in its axis of rotation 9 via a torsion spring to the substrate 2, comprises a first rocker element 12 and a second rocker element 13. According to the first specific embodiment of the present invention shown in FIG. 1, the rocker structure 6 is developed to be geometrically asymmetrical (relative to axis of rotation 9), but is nevertheless balanced out with respect to accelerations acting perpendicularly to the main extension plane 3. The first rocker element 12 has a greater surface than the second rocker element 13 in order to produce a surface asymmetry about axis of rotation 9. An additional mass is situated on second rocker element 13 in order to balance out the mass imbalance of the rocker resulting from the surface asymmetry. The first rocker element 12 is situated at a distance 11 from the surface 7 of substrate 2 (situated opposite first rocker element 12) and the second rocker element 13 is situated at a further distance 14 from a further surface 8 of the substrate, the distance 11 and the further distance 14 being provided in the first specific embodiment shown in FIG. 1 to be equal or essentially equal. The rocker elements 12, 13 comprise in particular two movable functional layers. A first functional layer 16, which is situated in parallel to the surface of substrate 2, and a second functional layer 17, which is likewise situated in parallel to the surface of substrate 2, but shifted perpendicularly with respect to the surface of the substrate. Parallel to the main extension plane or in the main extension plane 3, electrodes are situated in stationary and symmetrical fashion opposite rocker elements 12, 13, a first electrode 10 being situated opposite first rocker element 12 (or a portion of first rocker element) and a second electrode 10' being situated opposite second rocker element 13.

Figure 2:
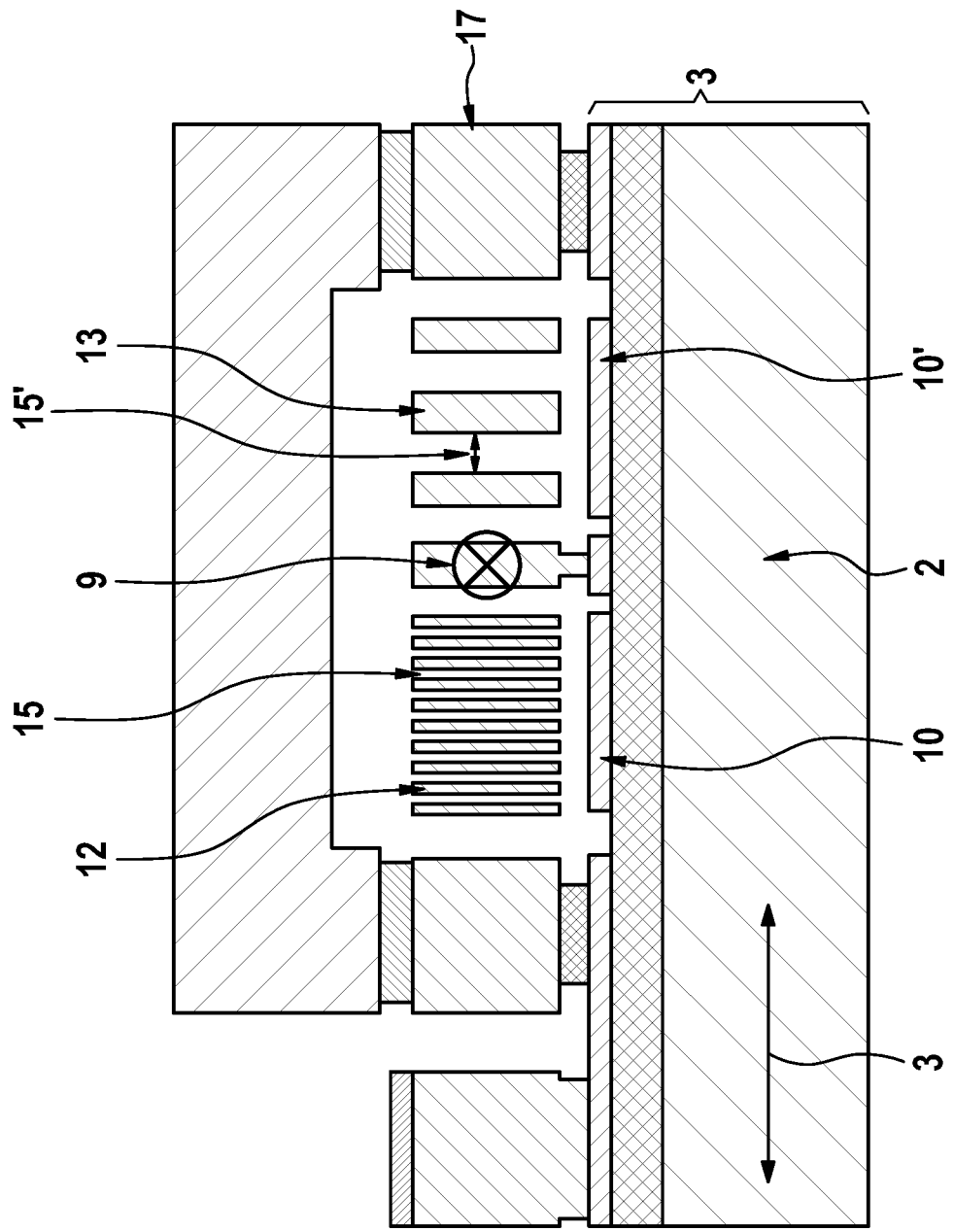
FIG. 2 shows a schematic representation of the sensor system according to a second specific example embodiment of the present invention.

FIG. 2 shows a second specific embodiment of the sensor system 1 according to the present invention. An essential difference with respect to the first specific embodiment is the fact that first rocker element 12 and second rocker element 13 of rocker structure 6 are balanced with respect to the distribution of mass. Additional masses are not added in this specific embodiment. An asymmetrical formation of perforations relative to the axis of rotation 9 exists in rocker structure 6. The perforation holes 15 of first rocker element 12 are narrower than the perforation holes 15' of second rocker element 13. The perforation holes 15 of first rocker element 12 are arranged more densely (or at smaller lateral intervals) in the functional layer than the perforation holes 15' of second rocker element 13. As a result, first rocker element 12 has a greater surface area than second rocker element 13, so that there is a surface asymmetry in rocker structure 6 relative to the axis of rotation 9, while the volume (and thus the weight) of the two rocker elements is the same (relative to the axis of rotation 9). The radiometric effect acts on all surfaces of the rocker structure (opposite the respective substrate surface), which come into contact with the gas molecules, and thus also on the perpendicular boundary surfaces of the perforation holes 15, 15'. Due to the surface asymmetry of the rocker structure 6, the distribution of forces (resulting from the radiometric effect) is developed asymmetrically with respect to the axis of rotation 9. The asymmetrical action of force on the rocker structure 6 results in a deflection of the rocker structure 6.

In the second specific embodiment of the present invention as well, electrodes 10, 10' are situated in a stationary manner (and symmetrically relative to axis of rotation 9) opposite rocker elements 12, 13 in parallel to the main extension plane or in the main extension plane 3. A variant of the second specific embodiment that is not shown provides for the perforation formation of the two rocker elements 12, 13 in the area of electrodes 10, 10' (situated below rocker elements 12, 13) to be identical on both sides of the axis of rotation 9 (i.e., for example, that no perforation exists or that a similar perforation exists) and for the aforementioned perforation formation differing in the first rocker element 12 compared to the second rocker element 13 to refer only to the areas (in particular areas further removed from the axis of rotation) of the rocker elements 12, 13, opposite which electrodes 10, 10' are not situated or positioned (i.e., to refer only to the portions of the rocker elements 12, 13 opposite the respective substrate surfaces 7 and 8, respectively).

Figure 3:
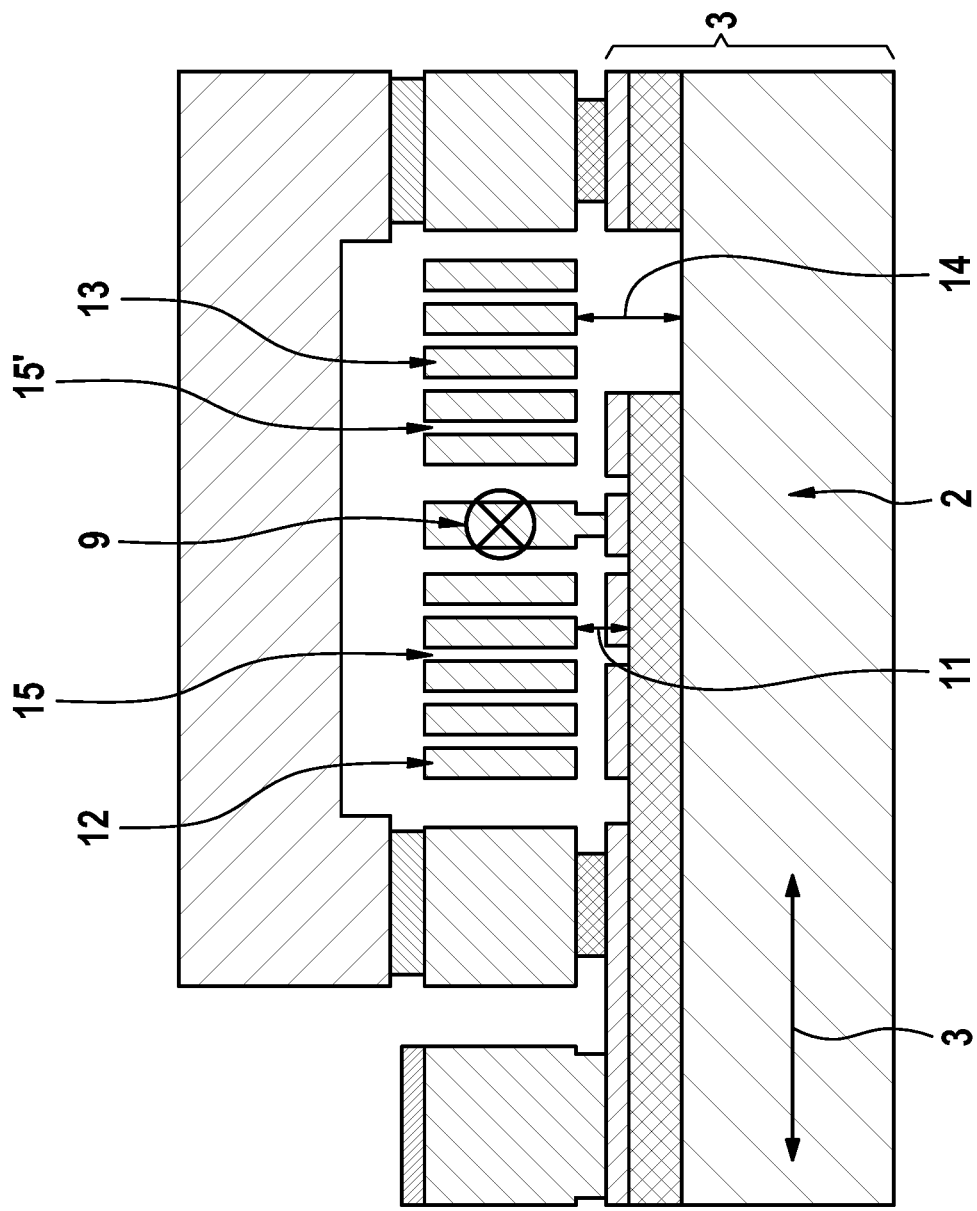
FIG. 3 shows a schematic representation of the sensor system according to a third specific example embodiment of the present invention.

FIG. 3 shows a third specific embodiment of the sensor system 1 according to the present invention. A main difference with respect to the second specific example embodiment is the fact that the rocker structure 6 here exhibits a symmetrical geometry (on both sides of axis of rotation 9 and likewise a symmetrical distribution of mass on both sides of the axis of rotation 9). A further main difference is that an asymmetry exists relative to the (or on both dies of the) axis of rotation 9 in the sense that the perpendicular distances of the rocker elements 12, 13 from the surface of substrate 2 (or the perpendicular distances of at least one portion of the rocker elements 12, 13) differ. The distance 11 and the further distance 14 from the surfaces of substrate 2 below are provided to be different. Parallel to main extension plane 3 or in main extension plane 3, the first electrode 10 and the second electrode 10' are again situated opposite rocker elements 12, 13. In the third specific embodiment, the radiometric effect is not, as shown in the second specific embodiment, dependent on the (different) surface of the rocker elements, but rather on the distances 11, 14 of the rocker elements 12, 13 from the surface of substrate 2 or on the distances of portions of the rocker elements 12, 13—in particular those portions of the rocker elements 12, 13, which are not situated opposite electrodes 10, 10, but are situated in particular further removed from axis of rotation 9 opposite the respective substrate surfaces 7 and 8, respectively. Due to the different distances of rocker elements 12, 13 from the surface of substrate 2, different forces act on the first rocker element 12 and the second rocker element 13, so that an asymmetrical distribution of forces is produced relative to axis of rotation 9. The asymmetrical action of forces on the rocker structure 6 results in any case in an action of force and may consequently also result in a deflection of the rocker structure 6.

According to a further variant of the third specific embodiment, the rocker elements 12, 13 in their areas opposite electrodes 10, 10' have the same distances from the substrate surface (i.e., from electrodes 10, 10'). Outside of this area, the distances of the rocker elements 12, 13 from the respectively considered surface areas of substrate 2 differ from each other.

What is claimed is:

1. A sensor system, comprising:
   a substrate extending in a main extension plane;
   a closed cavity; and
   a movable structure in the closed cavity, at least one portion of the movable structure being situated at a distance opposite a surface of the substrate within the cavity extending in parallel to the main extension plane, the distance varying when the movable structure is deflected, wherein a temperature difference between the surface of the substrate and the movable structure is measurable by an action of force on the movable structure,
   wherein the movable structure is a two-sided rocker structure having an axis of rotation, the rocker structure including a first rocker element and a second rocker element, at least one portion of the first rocker element being situated at a distance opposite the surface of the substrate extending in parallel to the main extension plane within the cavity and at least one portion of the second rocker element being situated at a further distance opposite a further surface of the substrate extending in parallel to the main extension plane within the cavity, a distribution of mass of the rocker structure relative to the axis of rotation being balanced out with respect to accelerative forces acting perpendicularly to the main extension plane,
   wherein in a geometric asymmetry of the rocker structure about the axis of rotation, a mass of the first rocker element and a mass of the second rocker element are chosen in such a way that the rocker structure is balanced out with respect to accelerative forces acting perpendicularly to the main extension plane,
   wherein multiple rocker structures are situated in the sensor system within separate closed cavities, each cavity having a different gas pressure.

2. The sensor system as recited in claim 1, wherein due to the action of force on the movable structure, the movable structure is deflected in a direction perpendicular to the main extension plane as a function of the temperature difference between the surface of the substrate and the movable structure.

3. The sensor system as recited in claim 1, wherein the movable structure is situated at the distance from the surface of the substrate, a gas pressure prevailing in the cavity being chosen in such a way that the distance is at its maximum 25 times and at its minimum one thousandth of a mean free path length of gas particles enclosed in the cavity.

4. The sensor system as recited in claim 1, wherein at least one electrode is situated opposite the movable structure in parallel to the main extension plane and the deflection of the movable structure perpendicular to the main extension plane is capacitively measurable.

5. The sensor system as recited in claim 1, wherein the distance and the further distance differ.

6. The sensor system as recited in claim 1, wherein, in addition to the movable structure, at least one further movable structure is situated within the closed cavity.

7. A method for measuring a temperature difference between a surface of a substrate and a movable structure using a sensor system, the sensor system including a substrate extending in a main extension plane, a closed cavity, and a movable structure in the closed cavity, at least one portion of the movable structure being situated at a distance opposite a surface of the substrate within the cavity extending in parallel to the main extension plane, the distance varying when the movable structure is deflected, the method comprising:
  measuring a temperature difference between the surface of the substrate and the movable structure by an action of force on the movable structure,
  wherein the movable structure is a two-sided rocker structure having an axis of rotation, the rocker structure including a first rocker element and a second rocker element, at least one portion of the first rocker element being situated at a distance opposite the surface of the substrate extending in parallel to the main extension plane within the cavity and at least one portion of the second rocker element being situated at a further distance opposite a further surface of the substrate extending in parallel to the main extension plane within the cavity, a distribution of mass of the rocker structure relative to the axis of rotation being balanced out with respect to accelerative forces acting perpendicularly to the main extension plane,
  wherein in a geometric asymmetry of the rocker structure about the axis of rotation, a mass of the first rocker element and a mass of the second rocker element are chosen in such a way that the rocker structure is balanced out with respect to accelerative forces acting perpendicularly to the main extension plane,
  wherein multiple rocker structures are situated in the sensor system within separate closed cavities, each cavity having a different gas pressure.

* * * * *